United States Patent
Alhozaimy et al.

(10) Patent No.: US 9,039,830 B2
(45) Date of Patent: May 26, 2015

(54) CEMENT COMPOSITION CONTAINING DUNE SAND AND LIMESTONE POWDER, CONCRETE PRODUCTS AND METHOD FOR MAKING CONCRETE PRODUCTS

(71) Applicant: King Saud University, Riyadh (SA)

(72) Inventors: Abdulrahman M. Alhozaimy, Riyadh (SA); Mohd. S. Jaafar, Selangor (MY); Abdulaziz Al-Negheimish, Riyadh (SA); Omer A. Alawad, Riyadh (SA)

(73) Assignee: King Saud University, Riyadh (SA)

( * ) Notice: Subject to any disclaimer, the term of this patent is extended or adjusted under 35 U.S.C. 154(b) by 288 days.

(21) Appl. No.: 13/647,656

(22) Filed: Oct. 9, 2012

(65) Prior Publication Data

US 2014/0097557 A1    Apr. 10, 2014

(51) Int. Cl.
  *C04B 14/28*  (2006.01)
  *C04B 28/04*  (2006.01)
  *C04B 40/02*  (2006.01)

(52) U.S. Cl.
  CPC .............. *C04B 28/04* (2013.01); *C04B 40/024* (2013.01)

(58) Field of Classification Search
  CPC ........................................................ C04B 14/28
  USPC ........................................ 106/713, 737, 738
  See application file for complete search history.

(56) References Cited

U.S. PATENT DOCUMENTS

| | | | |
|---|---|---|---|
| 4,026,716 A * | 5/1977 | Urschel, III et al. | 106/738 |
| 4,268,316 A | 5/1981 | Wills, Jr. | |
| 5,522,927 A | 6/1996 | Hegge | |
| 5,603,758 A | 2/1997 | Schreifels, Jr. et al. | |
| 5,820,668 A | 10/1998 | Comrie | |
| 6,402,831 B1 * | 6/2002 | Sawara et al. | 106/738 |
| 6,635,109 B1 | 10/2003 | Wineland et al. | |
| 7,578,881 B2 | 8/2009 | Ramme | |
| 2011/0048287 A1 | 3/2011 | Alhozaimy et al. | |

FOREIGN PATENT DOCUMENTS

CN    101318800 A    12/2008
CN    102001844 A    4/2011

* cited by examiner

*Primary Examiner* — Paul Marcantoni
(74) *Attorney, Agent, or Firm* — Lowe Hauptman & Ham LLP

(57) ABSTRACT

A raw batch composition for concrete or concrete wherein the raw batch composition comprises Portland cement of about 15 wgt. % to about 45 wgt. % and dune sand preferably red dune sand is present in an amount of about 40 wgt. %. The dune sand has a particle size of less than or equal to 45 microns. The composition also includes limestone powder ranging from about 15 wgt. % to 45 wgt. % with particle sizes less than or equal to 45 microns to form a base material. To this base material suitable amounts of fine aggregate, coarse aggregate, water and superplasticizer are added. A method for producing a cast concrete product having a compressive strength of between 62 MPa and 90 MPa is disclosed. The method comprises a step of providing Portland cement, dune sand and limestone powder.

11 Claims, 2 Drawing Sheets

Compressive strength of mixtures cured under Standard curing and Autoclave curing conditions.

Compressive strength of mixtures cured under Standard curing and Autoclave curing conditions.

X-ray diffraction annalysis of autoclave cured mixtures

CEMENT COMPOSITION CONTAINING DUNE SAND AND LIMESTONE POWDER, CONCRETE PRODUCTS AND METHOD FOR MAKING CONCRETE PRODUCTS

FIELD OF THE INVENTION

This invention relates to a cement composition and more particularly to a cement composition containing red dune sand powder, limestone powder, aggregate and water, concrete products made therefrom and methods for making such products.

BACKGROUND FOR THE INVENTION

Portland cement is one of the most important materials in the construction industry because of its multiple applications and mechanical and physical properties. The current production rate for Portland cement is about two billion tons per year and is predicted to increase to about 3.5 billion tons per year by 2015. However, the costs and volume used are important factors that have led to a search for new materials for replacing a part of the cement and for new materials that will lead to improved products.

A problem with the use of Portland cement is that the production of Portland cement is highly energy intensive with a significant environmental impact. For example, the production of one ton of Portland cement produces about one ton of carbon dioxide into the atmosphere or about seven percent of the global carbon dioxide emissions. Therefore, there is a pressing need for developing green building materials to fulfill the increase in demand for Portland cement.

High performance concrete consumes high cement content namely about 500 kg/m$^3$. Consequently, concrete producers frequently blend cement with pozzolan materials such as fly ash, silica fume and ground granulated blast furnace slag. The pozzolan materials have become very relevant due to their capacity to interact with the cement components and to improve its properties. The pozzolans are siliceous or silica-aluminous materials that in themselves have little or no cementitious value, but in finely divided form and in the presence of moisture chemically react with calcium hydroxide at ordinary temperatures to generate compounds possessing cementitious properties.

Pozzolan materials such as silica fume and fly ash are considered to be basic materials for the production of high performance concrete. However, costs for these materials have increased and their availability threatens to pose problems for the sustainable production of certain concrete products. Consequently, there is a need for less expensive materials for the partial replacement of cement in concrete products. It has also been recognized that civil construction applications such as roads, bridges, commercial and residential buildings, etc. that require significant amounts of cement based concrete would benefit from a lower cementitious material that reduces the demand for cement and dependency on the availability of pozzolan materials.

Researchers have attempted to find cheaper and more readily available materials as partial replacements for cement. For example, a U.S. Pat. No. 5,820,668 of Comrie discloses an inorganic binder composition that may be used in partial substitution for Portland cement. The inorganic binder composition includes materials such as fly ash, $Al_2O_3$, pozzolan, ground slag, nephelene cyanite, anhydrous aluminum silicate, hydrous aluminum silicate, hydrous sodium hydroxide, silicic acid, potassium salt, and sodium salt.

A more recent U.S. Patent Application Publication No. 2005/016096 of Comrie also discloses cementitious materials including stainless steel slag and geopolymer that can be added to conventional cement compositions, such as Portland cement as a partial or total replacement for conventional cement materials. The stainless steel slag may comprise silicates and/or oxides of calcium, silicon, magnesium, iron, aluminum, manganese, titanium, sulfur, chromium and/or nickel. The geopolymer may comprise aluminum silicate and/or magnesium silicate. In a preferred embodiment, curing of concrete materials by the action of water on the cementitious materials is enhanced with the addition of an activator component selected from calcium bromide, calcium nitrate, calcium nitrite, calcium chloride, calcium oxide, and sodium bromide.

Even more recently a U.S. Patent Application Publication No. 2011/0048287, incorporated herein in its entirety by referenced, published on Mar. 3, 2011 relates to a cement/aggregate composition, concrete product and method for making a concrete product wherein the concrete product is produced by providing red dune sand having a particle size of 45 microns or less and mixing the red dune sand with a hydraulic cement in a ratio of about 30 percent of the cement being replaced by the red dune sand. The cement and red dune sand are then mixed with fine and coarse aggregate, water and a superplasticizer and cast after pouring into a mold cavity. Then within 24 hours of casting the cast article is steam cured for 12 hours under atmospheric pressure, demolded and placed in an autoclave at 100 percent humidity. The temperature in the autoclave is raised to 180° C. within one to two hours and maintained at that temperature for four to five hours. The temperature also increases the pressure to about 10 bars. The pressure is released to reach atmospheric pressure within 20 to 30 minutes and the temperature reduced gradually so that the article can be removed.

Dune sand is an abundant natural material and is found in many parts of the world. The sand is rich in silicon dioxide ($SiO_2$), but in the less reactive form. One approach to utilize the dune sand as cement replacement material was disclosed in a previous U.S. Patent Application Publication No. 2011/0048287 of Alhozaimy et al. As disclosed therein the milled or ground dune sand has a particle size of about 45 microns or less and is used as a partial replacement of up to 30 percent of the cement to provide concrete with comparable strength to plain concrete. The 30 percent replacement of cement by milled dune sand was considered to provide a sufficient amount of silica ($SiO_2$) that can react with $Ca(OH)_2$ generated from the 70 percent of cement to produce products having cementitious properties.

The use of a combination of naturally available dune sand and limestone after milling or grinding have shown potential as a replacement for up to 85% of the Portland cement in concrete products.

SUMMARY OF THE INVENTION

In essence, the present invention contemplates a raw batch composition for concrete and/or concrete wherein the raw batch composition comprises or consists of Portland cement of about 15 wgt. % to about 45 wgt. % and dune sand preferably red dune sand is present in an amount of about 40 wgt. %. The dune sand has a particle size of less than or equal to 45 microns. The composition also includes limestone powder ranging from about 15 wgt. % to 45 wgt. % with particle sizes less than or equal to 45 microns to form a base material. To this base material suitable amounts of fine aggregates, coarse aggregates and water are added together with an appropriate amount of a superplasticizer.

The invention also contemplates a method for producing a cast concrete product having a compressive strength of between 62 MPa and 90 MPa. The method comprises or consists of the following steps. In a first step, masses of Portland cement, dune sand and limestone powder are provided. Then the red dune sand and limestone powder are homogenized by grinding the dune sand to provide particle sizes of 45 microns or less. The dune sand and limestone are mixed with cement, aggregate and water and in some cases an appropriate amount of superplasticizer.

The concrete mix is cast in a predetermined shape by placing the mix in a mold to produce a molded article. Then within 24 hours of casting, the molded article is steam cured for 12 hours under atmospheric pressure. The molded article is placed inside a curing chamber and 100% humidity is maintained. The temperature in the curing chamber is raised to a temperature of between 160° C. and 200° C. within one to two hours to thereby increase the pressure to 10 bars and then maintaining a temperature of about 180° C. at 100% humidity within the curing chamber for four to five hours. Finally, the pressure is allowed to reach atmospheric within 20 to 30 minutes and the temperature is reduced gradually.

The invention will now be described in connection with the accompanying drawings.

DESCRIPTION OF THE PREFERRED EMBODIMENTS OF THE INVENTION

Figure 1:
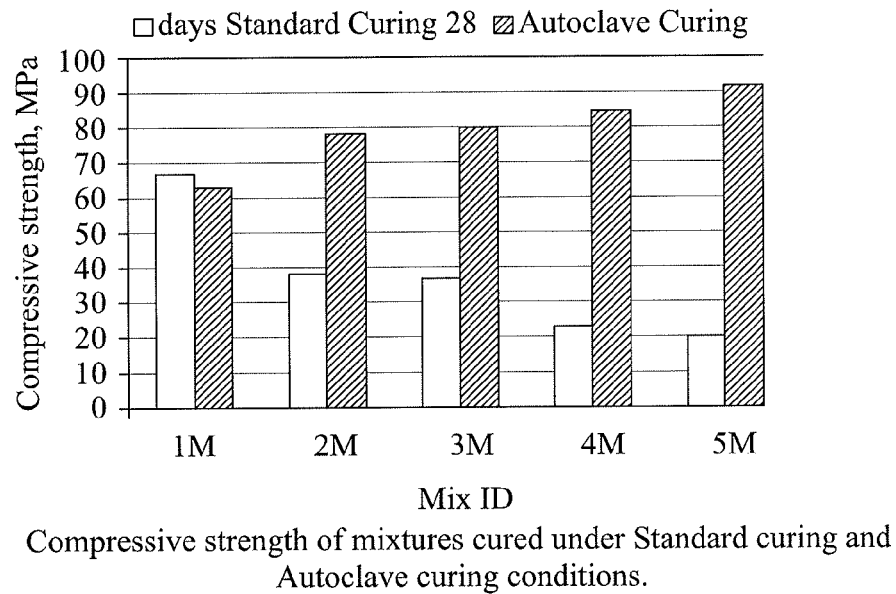
FIG. 1 is a graphical illustration of the compressive strength of five mixes subjected to standard curing for 28 days and for comparison autoclave curing.

Dune sand is an abundant natural material and is found in many parts of the world. Such sand is rich in silica ($SiO_2$) but is in a less reactive form. One approach to utilize the dune sand as cement replacement material is disclosed in a previous U.S. Patent Publication No. 2011/0048287 A1 entitled "Cement/Aggregate Composition, Concrete Product and Method for Making a Concrete Product (Alhozaimy et al., 2009). As disclosed therein the milled dune sand having a particle size of 45 microns or less is used as a partial replacement of up to 30% of the cement to provide concrete with comparable strength to plain concrete. The 30% replacement of cement by milled dune sand was considered to provide sufficient amount of silica ($SiO_2$) that can react with $Ca(OH)_2$ generated from the 70% of cement to produce additional products having cementitious properties (Calcium-Silicate-Hydrate).

It is now been found that the combination of naturally available dune sand and limestone after homogenizing by milling or grinding the dune sand have shown potential as a high volume Portland cement replacement material in concrete manufacturing. Limestone powder is not a pozzolanic material but is used sometimes as a filler material in the production of self-consolidating concrete.

The current invention is a result of a study designed to promote the utilization of dune sand powder and limestone powder combination as a high volume Portland cement replacement material in the concrete industry. A cement replacement of up to 85% by wgt. was shown to be possible. Further the successful use of dune sand powder and limestone powder combination to reduce Portland cement consumption can have a significant impact on the sustainability and economy of concrete construction.

Preliminary analysis of red dune sand obtained from sand dunes around Riyadh, Saudi Arabia and limestone have been conducted and it was found that their chemical compositions entitle them as potential materials for partial cement replacement. Initial test results have shown that red dune sand obtained from such sand dunes can be used as cement replacement material in concrete manufacturing.

The approximate composition of red dune sand with a reduced particle size, Portland cement and limestone powder are shown in Table 1.

TABLE 1

Chemical compositions of PC, DSP and LSP

|  | PC | DSP | LSP |
|---|---|---|---|
| $SiO_2$ | 22.62 | 91.4 | 0.16 |
| $Al_2O_3$ | 6.11 | 0.99 | 0.22 |
| $Fe_2O_3$ | 3.69 | 0.56 | 0.13 |
| CaO | 57.96 | 1.68 | 59.17 |
| MgO | 2.16 | 0.18 | 3.16 |
| $k_2O$ | 0.98 | 0.21 | 0.03 |
| $Na_2O$ | 0.17 | 0.17 | 0.09 |
| $SO_3$ | 2.99 | 0.06 | 0.21 |
| LOI (loss on ignition) | 3.02 | 1.15 | 21.54 |

Concrete mixes of various compositions were cast to determine the contribution of such dune sand to the strength properties of concrete when used as partial cement replacement. As in my previous patent publication the red sand was ground to small particles of less than 45 microns before it is used as a cement replacement in concrete mixes. The compositions of five different mixes are shown in Table 2.

TABLE 2

Constituent material for five different mixes

|  | M1 | M2 | M3 | M4 | M5 |
|---|---|---|---|---|---|
| PC (kg/m$^3$) | 560 | 336 | 252 | 168 | 84 |
| DSP (kg/m$^3$) | — | 224 | 224 | 224 | 224 |
| LSP (kg/m$^3$) | — | — | 84 | 168 | 252 |
| Fine aggregate (kg/m$^3$) | 1680 | 1680 | 1680 | 1680 | 1680 |
| Water (kg/m$^3$) | 168 | 168 | 168 | 168 | 168 |
| Superplasticizer (liter) | 6 | 6 | 9 | 12 | 12 |

As done in my earlier published application, the mixes were subjected to normal curing i.e., water cured at room temperature and autoclaved curing conditions.

Figure 2:
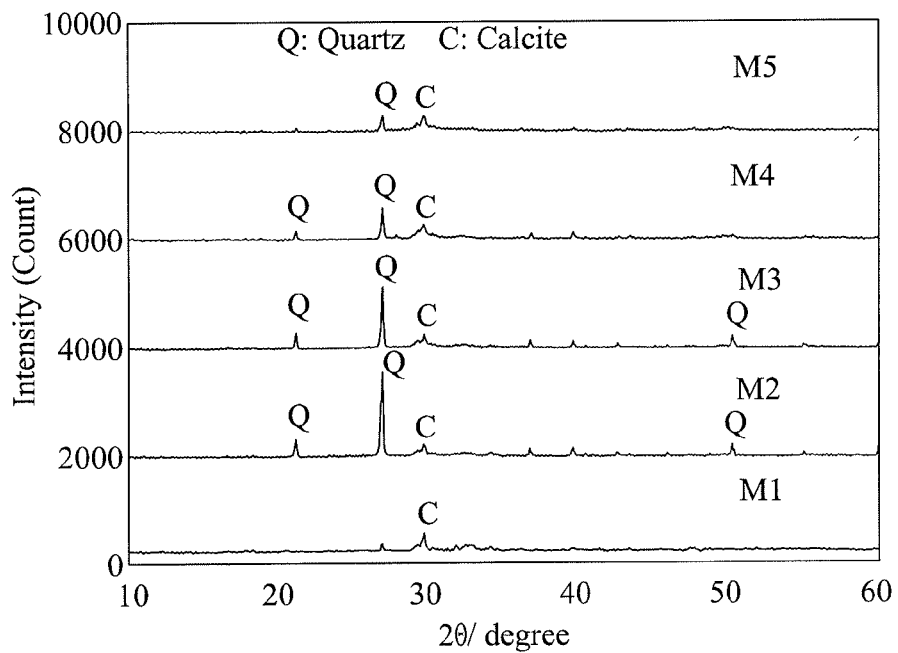
FIG. 2 illustrates an x-ray diffraction analysis of the five mixes illustrated in FIG. 1.
Figure 3:
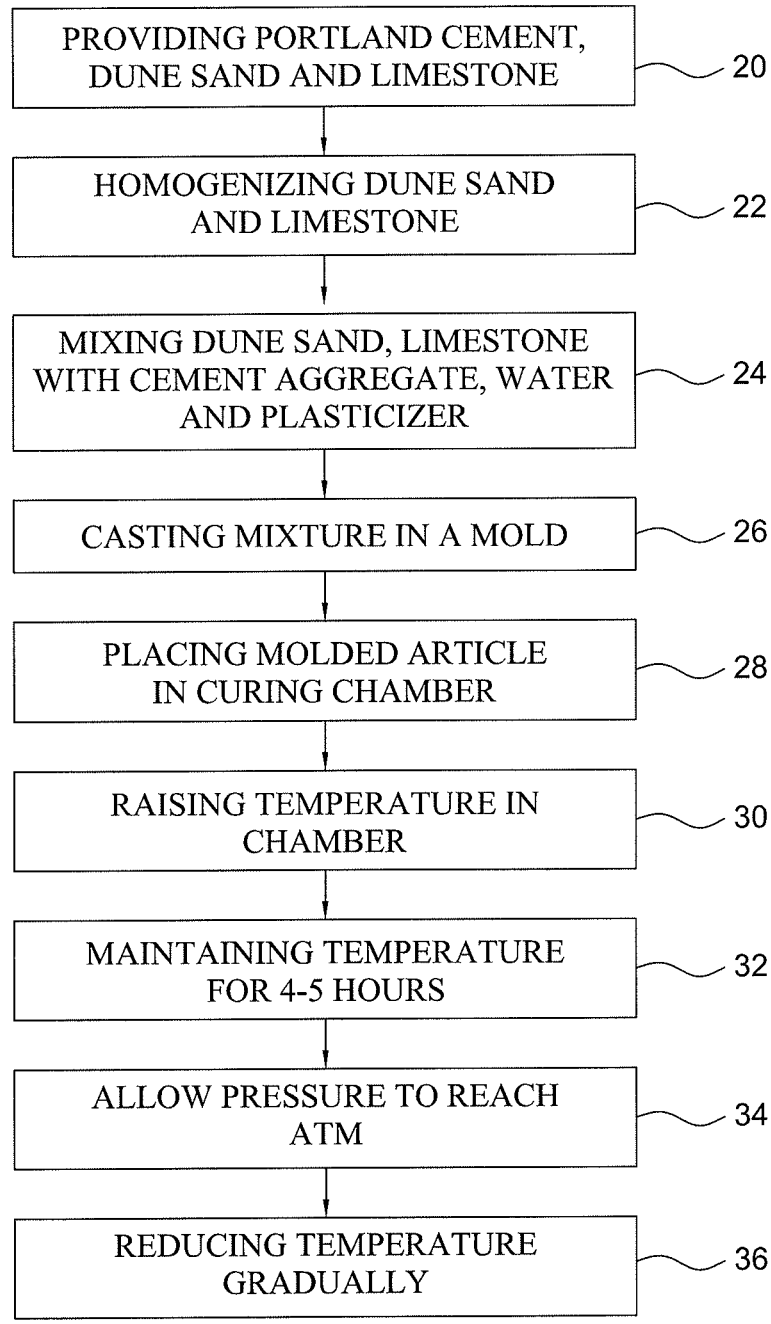
FIG. 3 is a flowchart illustrating a method for producing a concrete product in accordance with a further embodiment of the invention.

For further analysis, FIG. 2 illustrates the x-ray diffraction analysis of the autoclaved cured mixes. The materials were tested immediately after the curing process and indicated that there is clear potential for the use of dune sand and particularly red dune sand in concrete production. The process to transform the dune sand and limestone powder into partial cement replacement is less energy intensive than cement manufacturing more environmentally friendly, reduced release of $CO_2$ into the atmosphere, and capable of replacing up to 85% of ordinary Portland cement and thus economically attractive. Based on the analysis of test results, the current study indicates that the combination of dune sand powder and limestone powder combination allows the replacement of a high volume of Portland cement by up to 85% of the weight shown. This replacement can have a potentially significant impact on the concrete industry.

A total of five compositions have been prepared to determine the contribution of the interaction ingredients to the compressive strength performance. Forty percent of dune sand powder of the total binder composition was blended with various percentages of Portland cement and limestone powder (0, 15, 30, and 45 percent) to find the reaction balance point between crystalline silica and calcium hydroxide. The reaction balance point is defined as the point where all crystalline silica is consumed by the $Ca(OH)_2$ generated from the Portland cement and limestone powder. The details of the five combinations are as follows.
  a) Mixture M1: contains only Portland cement as binders (100% Portland cement) and serves as a controller.
  b) Mixture M2: contains 40% dune sand powder (ground dune sand) and 60% Portland cement.
  c) Mixture M3: contains 40% dune sand powder, 45% Portland cement and 15% limestone powder.
  d) Mixture M4: contains 40% dune sand powder, 30% Portland cement and 30% limestone powder.
  e) Mixture M5: contains 40% dune sand powder, 15% Portland cement and 45% limestone powder.

The method or production involves the following steps:

1. Dune sand and limestone are ground into particle sizes of less than 45 micron. The dune sand powder is mixed with limestone powder and Portland cement in the prescribed ratios. As a result, Portland cement is replaced with dune sand powder and limestone powder of up to 85%.

2. Binder materials (Portland cement, dune sand powder and limestone powder) are mixed with fine aggregates, water and superplasticizer complying with ASTM C 494 type F to form mortars. The proportions of the mortar are binder: fine aggregate:water with ratio of 1:3:0.30, respectively.

3. A total of five mixtures of mortar are fabricated in this study. Control mixture is batched using only Portland cement as binder material. For the other mixtures (M2-M5) the percent of dune sand powder is kept at 40% of total binder, while the remaining Portland cement is further replaced by limestone powder (0, 15, 30, and 45%). The mix proportion of mortar mixtures is presented in Table 2.

4. The raw materials are mixed in dry condition till uniform distribution is achieved then the final mixing of water and superplasticizer is completed. The mixer is run at low speed for about 0.5 minute followed by 3 minutes at high speed then it stopped for about 15 second. The remaining amount of water and superplasticizer was added and then the mixer was ran again for 2 minutes at high speed then stopped.

5. Cubic specimens (50 mm) in steel molds were cast to determine the compressive strength. All samples were cast in two layers and compacted on a vibration table for about 30 second.

6. After 24 hours the specimens were de-molded and transferred into a curing water tank. A group of specimens are steam cured for 12 hours under atmospheric pressure and put in an autoclave chamber at 100% humidity for autoclave curing. In the autoclave chamber, the temperature is increased from room temperature to 180° C. within one to two hours. The temperature also increased the pressure to 10 bars. The temperature and pressure are maintained for 5 hours then the autoclave heater is turned off. The room temperature is reached within 2 hours. The remaining specimens are kept in the water curing tank for standard curing until 28 days of age.

7. The compressive strength was determined in accordance of ASTM C305. The hydration product of pastes made of similar composition of mortars were mineralogical analyzed by X-ray diffraction, using a Shimadzu XRD-6000 diffractometer with a scanning rate of 2°/min from 10° to 60°.

The compressive strength results are shown in FIG. 1. These results show that under standard curing no strength improvement was observed by incorporation of dune sand powder and limestone powder as cement replacement. The compressive strength decreased as the level of replacement increased. However, under autoclave curing a significant contribution was found for all blended mixtures. The compressive strength of blended mixtures ranged between 77 to 91 MPa whereas the control mixture showed only 66 and 62 MPa for standard curing and autoclave curing, respectively. The highest compressive strength was achieved with combination of 15% Portland cement, 40% dune sand powder and 45% limestone powder.

The autoclave cured specimens were analyzed using X-ray diffraction and the results are shown in FIG. 2. Blended mixtures (M2-M5) display sharp peaks at 2-theta 20.9° and 26.7° refer to quartz or crystalline silica. However, as the level of limestone powder increased the quartz peak intensities decrease and almost diminished in M5 mixture. Therefore, the results clearly demonstrated the capability of using the combination of dune sand powder and limestone powder as cement replacement materials.

The process to produce high strength concrete herein is less energy intensive and more environmentally friendly. The replacement of Portland cement by dune sand powder and limestone powder of up to 85% can encourage concrete manufactures to optimize Portland cement usage in the production of high strength concrete especially in the precast products by utilizing these widely available natural resources. Moreover, limestone dust which is a waste by-product from stone crushers can also be utilized in lieu of limestone powder.

The method for producing a cast concrete product having a compressive strength of between 62 MPa and 90 MPa comprises or consists of the following steps:

Providing masses of Portland cement, dune sand and limestone powder;

Homogenizing the dune sand and limestone powder by grinding;

Mixing the dune sand and limestone with cement, aggregate, water and superplasticizer;

Casting in a shape by placing the mix in a mold;

Within 24 hours of casting curing under atmospheric pressure, the molded article is placed inside a curing chamber and maintained at 100% humidity. Raising the temperature in the curing chamber to a temperature between 160° C. and 200° C. within one to two hours to increase pressure to 10 bars.

Maintaining a temperature of about 180° C. at 100% humidity within the chamber for 4-5 hours. Finally, pressure is allowed to reach atmospheric pressure within 20 to 30 minutes and temperature is reduced gradually.

While the invention has been disclosed in connection with its preferred embodiments it should be recognized that changes and modifications may be made therein without departing from the scope of the claims.

What is claimed is:

1. A raw batch composition for concrete comprising:
  Portland cement;
  dune sand having a particle size of about 45 microns or less;
  limestone powder having a particle size of about 45 microns or less;
  aggregate other than dune sand;
  a sufficient amount of water to effect hydraulic setting of the cementitious compound; and wherein said Portland cement ranges from about 15 wgt. % to about 45 wgt. %, said dune sand is present in an amount of 40 wgt. % and said limestone powder ranges from about 15 wgt. % to about 45 wgt. % plus aggregate and water.

2. A raw batch composition according to claim 1, in which said dune sand is red dune sand having a composition of about 91.4 wgt. % $SiO_2$, about 0.99 wgt. % $Al_2O_3$, 0.56 wgt. % $Fe_2O_3$, 1.68 wgt. % MgO about 0.18 wgt. %, $K_2O$ 0.21 wgt. %, $Na_2O$ 0.17 wgt. %, $SO_3$ 0.06 wgt. % and LOI los on ignition 1.15 wgt. %.

3. A raw batch composition according to claim 1, in which an amount of superplasticizer, aggregate and water are added.

4. A raw batch composition according to claim 3, in which the Portland cement, dune sand powder and limestone powder, fine aggregate, water and superplasticizer are provided in a ratio of the following amounts Portland cement ($kg/m^3$) 252, dune sand powder ($kg/m^3$) 224, limestone powder ($kg/m^3$) 84, fine aggregate ($kg/m^3$) 1680, water ($kg/m^3$) 168 and superplasticizer ($kg/m^3$) 9.

5. A raw batch composition according to claim 3, in which the Portland cement, dune sand powder and limestone powder, fine aggregate, water and superplasticizer are provided in a ratio of the following amounts Portland cement ($kg/m^3$) 168, dune sand powder ($kg/m^3$) 224, limestone powder ($kg/m^3$) 168, fine aggregate ($kg/m^3$) 1680, water ($kg/m^3$) 168 and superplasticizer ($kg/m^3$) 12.

6. A raw batch composition according to claim 3, in which the Portland cement, dune sand powder and limestone powder, fine aggregate, water and superplasticizer are provided in a ratio of the following amounts Portland cement ($kg/m^3$) 84, dune sand powder ($kg/m^3$) 224, limestone powder ($kg/m^3$) 252, fine aggregate ($kg/m^3$) 1680, water ($kg/m^3$) 168 and superplasticizer ($kg/m^3$) 12.

7. A raw batch composition for concrete consisting of:
   Portland cement, red dune sand powder having a particle size of 45 microns or less, limestone powder having a particle size of 45 microns or less and wherein said Portland cement ranges from 15 wgt. % to 45 wgt. %, said red dune sand is about 40 wgt. % and said limestone powder ranges from about 15 wgt. % to 45 wgt. % to form a base mix; and
   fine aggregate, water and superplasticizer.

8. A raw batch composition according to claim 7, in which the following ingredients further consists of a ratio of the following amounts Portland cement ($kg/m^3$) 252, dune sand powder ($kg/m^3$) 224, limestone powder ($kg/m^3$) 84, fine aggregate ($kg/m^3$) 1680, water ($kg/m^3$) 168 and superplasticizer ($kg/m^3$) 9.

9. A raw batch composition according to claim 7, in which the following ingredients further consists of a ratio of the following amounts Portland cement ($kg/m^3$) 168, dune sand powder ($kg/m^3$) 224, limestone powder ($kg/m^3$) 168, fine aggregate ($kg/m^3$) 1680, water ($kg/m^3$) 168 and superplasticizer ($kg/m^3$) 12.

10. A raw batch composition according to claim 7, in which the following ingredients further consists of a ratio of the following amounts Portland cement ($kg/m^3$) 84, dune sand powder ($kg/m^3$) 224, limestone powder ($kg/m^3$) 252, fine aggregate ($kg/m^3$) 1680, water ($kg/m^3$) 168 and superplasticizer ($kg/m^3$) 12.

11. A method for producing a cast concrete product in which the steps consists of:
   a) providing red dune sand and limestone;
   b) grinding said red dune sand and said limestone to produce particle sizes of less than 45 microns;
   c) mixing the dune sand and limestone with cement, aggregate other than red dune sand, water and superplasticizer to produce a cement mix with about 40% dune sand powder and a range of Portland cement from 15 wgt. % to 45 wgt. % and limestone powder from 15 wgt. % to 45 wgt. %;
   d) casting the concrete mix in a predetermined shape by placing the concrete mix in a mold to produce a molded article;
   e) within 24 hours of casting, steam curing the molded article for 12 hours under atmospheric pressure;
   f) de-molding the molded article and placing the molded article inside a curing chamber and maintaining 100% humidity in the curing chamber;
   g) raising the temperature in the curing chamber to between 160° C. and 200° C. within two hours to thereby raise the pressure to 10 bars and maintaining the 180° C. temperature at 100% humidity within the curing chamber for 4 to 5 hours;
   h) releasing the pressure to reach atmospheric pressure within 20-30 minutes and the temperature is reduced gradually.

* * * * *